US006492018B1

(12) United States Patent
Guddal

(10) Patent No.: US 6,492,018 B1
(45) Date of Patent: Dec. 10, 2002

(54) APPARATUS FOR APPLYING AN IMPROVED ADHESIVE TO SHEET INSULATION HAVING DRAINAGE CHANNELS

(76) Inventor: Karl Guddal, 2839 NW. 64th, Seattle, WA (US) 98107

( * ) Notice: Subject to any disclaimer, the term of this patent is extended or adjusted under 35 U.S.C. 154(b) by 37 days.

(21) Appl. No.: 09/677,580

(22) Filed: Oct. 2, 2000

Related U.S. Application Data

(62) Division of application No. 09/062,269, filed on Apr. 17, 1998, now Pat. No. 6,125,902.

(51) Int. Cl.[7] ............................ B32B 7/12; B32B 15/04

(52) U.S. Cl. ................. 428/343; 428/317.3; 428/317.7; 428/98; 428/402

(58) Field of Search ................................ 428/343, 402, 428/317.7, 317.3, 98

(56) References Cited

U.S. PATENT DOCUMENTS

| | | | | |
|---|---|---|---|---|
| 371,155 A | | 10/1887 | Videto | |
| 964,133 A | | 7/1910 | Strehler | |
| 1,117,341 A | | 11/1914 | Cross | |
| 1,792,788 A | | 2/1931 | Wilde et al. | |
| 1,863,545 A | | 6/1932 | Raettig | |
| 1,980,216 A | | 11/1934 | Merritt | |
| 2,054,448 A | | 9/1936 | Russell | |
| 2,066,780 A | | 1/1937 | Holt | |
| 2,329,378 A | | 9/1943 | Kuehner | |
| 2,345,937 A | | 4/1944 | Joa | |
| 2,353,474 A | | 7/1944 | Kiehn | |
| 2,373,239 A | | 4/1945 | Fenn | |
| 2,374,659 A | | 5/1945 | Bassler | |
| 2,439,040 A | | 4/1948 | Cohen | |
| 2,570,379 A | | 10/1951 | Robinson | |
| 2,588,874 A | | 3/1952 | Quick | |
| 2,625,978 A | | 1/1953 | Patterson | |
| 2,646,364 A | * | 7/1953 | Porth | |
| 3,526,535 A | | 9/1970 | Plumat | |
| 3,562,808 A | | 2/1971 | Whitley, Jr. | |
| 3,611,470 A | | 10/1971 | Gaston | |
| 3,655,482 A | * | 4/1972 | Schildkraut et al. | 156/276 |
| 3,744,621 A | | 7/1973 | Adams et al. | |
| 4,141,946 A | | 2/1979 | Rauenhorst | |
| 4,545,840 A | * | 10/1985 | Newman et al. | 156/276 |
| 4,804,321 A | | 2/1989 | Riesgo | |
| 4,956,951 A | * | 9/1990 | Kannankeril | 52/169.5 |
| 5,115,907 A | | 5/1992 | Pomara, Jr. | |
| 5,421,887 A | | 6/1995 | Guddal | |

* cited by examiner

*Primary Examiner*—Daniel Zirker
*Assistant Examiner*—Victor S. Chang
(74) *Attorney, Agent, or Firm*—Lloyd L. Zickert

(57) ABSTRACT

An apparatus for applying an improved adhesive to a series of sheets of insulation having drainage channels, wherein the apparatus includes a frame with a power-driven conveyor, a magazine for receiving sheets in stacked relation, and an elongated adhesive dispensing hopper adapted to apply an adhesive mixture having spacer beads or particles mixed therein on the top surface of each sheet of insulation adjacent to the drainage channels and including a shutter mechanism for forming transversely extending substantially adhesive-free pathways between the drainage channels and a screed attached to the hopper having optional scraper blades which wipe away any adhesive that may flow in the drainage channels.

8 Claims, 4 Drawing Sheets

APPARATUS FOR APPLYING AN IMPROVED ADHESIVE TO SHEET INSULATION HAVING DRAINAGE CHANNELS

This application is a divisional application of my application Ser. No. 09/062,269, now U.S. Pat. No. 6,125,902 filed Apr. 17, 1998, and is filed under 35 U.S.C. §121.

This invention relates in general to an apparatus for applying an improved adhesive to sheet insulation having drainage channels, and more particularly to an apparatus for applying an improved adhesive to a series of sheets of insulation having transversely spaced apart drainage channels while preventing the adhesive from entering the channels and thereby significantly reducing the amount of time and labor necessary for coating the sheets of insulation with adhesive, and further to an adhesive which includes means for defining channels through which moisture and/or air can pass.

BACKGROUND OF THE INVENTION

Heretofore, it has been well known in the building and construction industries to attach sheets of insulation or insulation board to an erected building substrate such as gypsum, concrete, or other masonry. The sheets of insulation are applied uniformly to the entire substrate of the building for insulation purposes. An aesthetic, waterproof, and impact-resistant finishing material or system is generally applied over the insulation. One example of such an application is the "THOROWALL" system in which the insulation is an Expanded Poly-Styrofoam, commonly referred to as "EPS." "THOROWALL" is a trademark owned by Thoro System Products. Besides EPS, there are numerous types of sheet insulation material including different types of styrofoam available for use in building construction. The EPS sheets are generally light in weight, approximately one pound per cubic foot, and their dimensions vary, although a standard size is two feet wide by four feet long with a thickness of one, two, or more inches. When affixed to a building substrate, the longer dimension of the sheets extends horizontally.

Although the finishing material is waterproof, moisture has a tendency to buildup between the insulation and substrate. To eliminate this moisture problem, the construction industry has developed and employed sheet insulation having spaced apart drainage channels along the shorter dimension of the sheets such that the channels are vertically disposed on and adjacent to the building substrate to funnel downwardly the moisture trapped between the substrate and the insulation. One example of the channeled sheet insulation is the "INFINITY" system in which the insulation includes beveled edges and vertically extending (i.e., when installed) drainage channels. "INFINITY" is a trademark owned by Dryvit Systems Inc.

While mechanical fasteners have been used to attach this type of sheet insulation to a substrate, a common method has been to apply adhesive or glue to the sheets of insulation to adhesively secure the insulation to an erected building substrate. Several types of adhesives are commercially available, some being more suitable to different substrates, different types of insulation, and differing climates. Also, it has been known to mix some adhesives with cement.

Heretofore, adhesives have either been manually applied to sheets of insulation or applied by adhesive-applying machines such as shown in U.S. Pat. No. 5,421,887. However, such machines are ineffective in applying adhesive to sheets of insulation having transversely spaced apart drainage channels because the machines would deposit adhesive into the drainage channels thereby blocking the drainage channels, which is undesirable. Moreover, even the manual application of conventional adhesives to sheets of insulation having drainage channels may result in the adhesive flowing into the channels when the insulation is pressed against the substrate, thereby blocking or closing the channels. Accordingly, there is a need for an adhesive which does not flow into the drainage channels when the insulation is pressed against the substrate and for an apparatus for applying the improved adhesive to a series of sheets of insulation having drainage channels and to additionally provide airflow passages between channels, while preventing the improved adhesive from entering the drainage channels.

SUMMARY OF THE INVENTION

The present invention overcomes the above problems in providing an apparatus for applying an improved adhesive to a series of sheets of insulation having transversely spaced apart drainage channels while preventing the adhesive from entering the channels and thereby significantly reducing the amount of time and labor necessary for coating the sheets with adhesive. Further, the improved adhesive of the present invention prevents or at least minimizes the amount of adhesive which flows into the drainage channels when the insulation is pressed against the substrate, thereby assuring the channels stay open to air flow. The improved adhesive compound includes a conventional adhesive containing a mixture of ground polyurethane spacer elements such as beads or particles. The beads act as spacers between the sheets of insulation and the substrate to limit the spreading of adhesive into the channels when the sheets are pressed against the substrate. Another embodiment of the invention is the use of the improved adhesive compound on standard sheets of insulation to define channels for moisture and/or air flow.

The adhesive applying apparatus of the present invention is an improvement to the adhesive applying apparatus disclosed in U.S. Pat. No. 5,421,887 which is incorporated herein by reference. The improved adhesive-applying apparatus includes a portable horizontally extending frame having an inlet section, an outlet section, and a central section disposed between the inlet and outlet sections. The inlet section of the frame includes a power-driven conveyor for driving a sheet of insulation from the inlet section to the central section and a magazine positioned above the conveyor for holding and dispensing sheets of insulation, one by one, onto the conveyor. The outlet section includes a sheet receiving conveyor having a stopping assembly for temporarily deactivating the power-driven conveyor until the sheet coated with adhesive is removed from the outlet section of the frame. The conveyor, the magazine, and the sheet receiving conveyor are all configured to hold, handle, and move the sheets of insulation along their shorter dimension, as opposed to holding, handling, and moving the sheets along their longer dimension as described in U.S. Pat. No. 5,421,887.

The sheets of insulation are coated with adhesive at the central section which includes an elongated or substantially wider adhesive dispensing hopper for storing and for applying the improved adhesive to the sheets of insulation as each sheet passes under the hopper. The hopper is adapted to dispense adhesive on the flat areas or portions of the sheets of insulation adjacent to the transversely spaced apart drainage channels. The bottom wall of the hopper includes a plurality of spaced apart slots aligned with these flat sections on the sheets of insulation through which the improved adhesive flows onto those sections. The hopper also includes a shutter for intermittently interrupting the flow of adhesive to the sheets of insulation to form substantially adhesive-free pathways on the sheets which provide communication between the drainage channels, thereby allowing the passage of air flow and/or moisture between drainage channels when the insulation is installed on the substrate. A screed is attached to the outlet wall of the hopper and includes a series of spaced apart teeth to form beads or lines of adhesive on the flat sections. The screed may further include a plurality of channel scraper blades to scrape away any adhesive that may enter the transversely spaced apart drainage channels.

To sequentially apply the improved adhesive to a series of sheets of insulation having transversely spaced apart drainage channels using the apparatus of the present invention, several sheets of insulation are loaded into the magazine arranged over the conveyer on the inlet section. The magazine dispenses the lowermost sheet onto the conveyor, and the conveyor drives the side edge of the sheet under the hopper. A pair of shutter driving wheels engage the sheet to facilitate the opening and closing of the shutter as the sheet moves under the hopper. The adhesive stored in the hopper flows through the spaced apart slots onto the flat sections of the sheet of insulation when the shutter is open and does not flow onto the sheet when the shutter is closed, thereby forming the substantially adhesive-free pathways between channels. The series of teeth along the lower end of the screed engage the sheet of insulation to uniformly spread the adhesive on the sheet. If channel scraper blades are included on the screed, and adhesive in the drainage channels will be removed as the sheet passes from underneath the hopper to the outlet section.

The apparatus may also be used to apply spaced apart beads of the improved adhesive on standard insulation sheets having substantially flat side walls to form channels between the beads that are maintained open when the sheets are applied to a building substrate.

As the sheet of insulation passes from under the hopper to the sheet receiving conveyor on the outlet section, it engages the stopping assembly which cuts power to the power-driven conveyer, thereby preventing the conveyer from driving the next sheet of insulation under the hopper until the first sheet coated with adhesive is removed from the outlet section. Once the first sheet is removed, the stopping assembly reactivates the power-driven conveyor which drives the second sheet of insulation completely under the hopper and to the outlet section. By repeating this process, adhesive is efficiently applied to sequential sheets of insulation.

It is therefore an object of the present invention to provide an apparatus for applying an improved adhesive to a series of sheets of insulation having transversely spaced apart drainage channels, wherein the channels will remain substantially open to air flow when mounted on a building substrate.

Another object of the present invention is to provide an apparatus for applying an improved adhesive to sheets of insulation having transversely spaced apart drainage channels which prevents adhesive from entering the channels.

Another object of the present invention is to provide an adhesive applying apparatus which forms substantially adhesive-free pathways across the sheets of insulation to allow communication between the drainage channels.

Another object of the present invention is to provide an improved adhesive compound adapted to be applied to sheets of insulation having one or more drainage channels which prevents the adhesive from flowing into the channels when the sheets of insulation are pressed against a substrate.

A still further object of the invention is to provide an improved adhesive-applying apparatus for applying an adhesive compound to sheets of insulation having drainage channels, which prevents adhesive from blocking or closing the channels when the sheets are affixed to a building substrate.

A further object of the invention is to provide an improved apparatus in combination with an improved adhesive for defining moisture and/or air flow channels on sheets of insulation secured to a building substrate.

Other objects, features and advantages of the invention will be apparent from the following detailed disclosure, taken in conjunction with the accompanying sheets of drawings, wherein like reference numerals refer to like parts.

DESCRIPTION OF THE INVENTION

Figure 1:
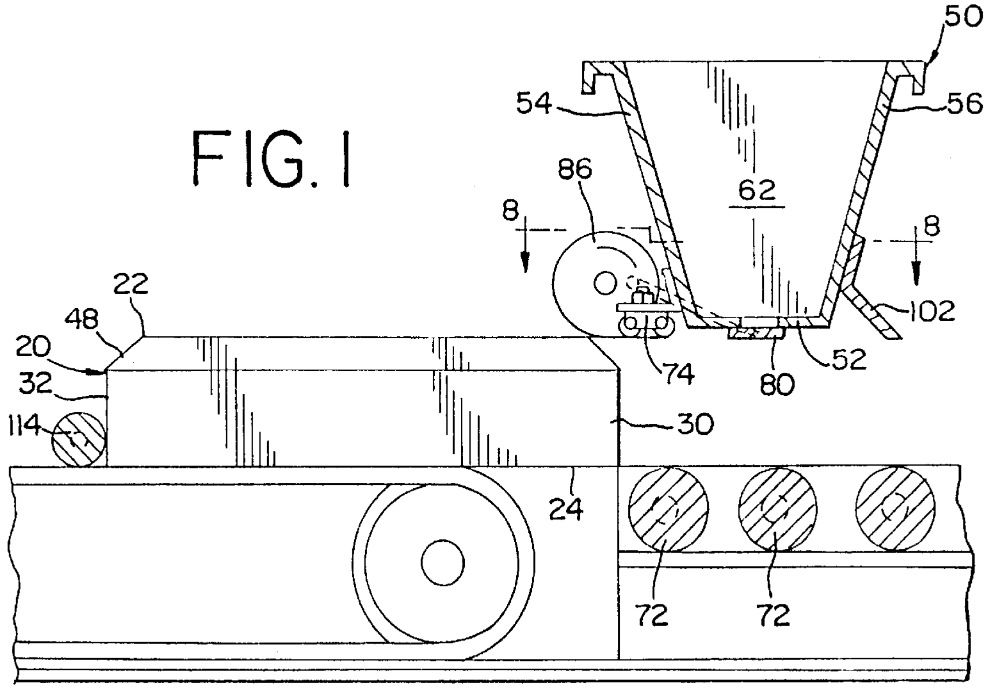
FIG. 1 is a fragmentary diagrammatic side view of the central section of the adhesive-applying apparatus of the present invention illustrating the hopper, the shutter, the shutter driving wheels, and the screed prior to filling the hopper with adhesive and before the first sheet of insulation is driven under the hopper.

The adhesive-applying apparatus of the present invention is adapted to selectively apply an improved adhesive to a series of substantially rectangular sheets of insulation having transversely spaced apart drainage channels. In particular, each sheet of insulation, as illustrated in FIGS. 1 through 7 and generally indicated by the numeral 20, has top and bottom surfaces 22 and 24, opposed ends walls 26 and 28, and opposed side edges 30 and 32. The top surface 22 includes a plurality of spaced apart substantially U-shaped drainage channels 34, 36, and 38 and a plurality of substantially flat adhesive-receiving areas or sections 40, 42, 44, and 46 adjacent to the drainage channels. The peripheral edge 48 around the top surface of the sheet may be beveled.

The improved adhesive compound 51 of the present invention includes a conventional adhesive used for affixing sheets of insulation to building substrates which contains ground polyurethane spacer elements such as particles or beads 53 of approximately a one-eighth inch diameter. The beads or particles act as spacers between the sheets of insulation and the substrate and prevent the adhesive from being squeezed into the drainage channels when the sheets are pressed against the substrate. The adhesive thereby prevents or at least minimizes the amount of adhesive which flows into the drainage channels when the insulation is pressed against the substrate, thereby keeping the channels open for air flow. It should be appreciated that the elements could alternatively be made of other suitable plastic materials.

The adhesive-applying apparatus of the present invention is an improvement to the adhesive-applying apparatus disclosed in U.S. Pat. No. 5,421,887; and the entire disclosure of U.S. Pat. No. 5,421,887 including the abstract, FIGS. 1 to 18, and the specification set forth in columns 1 through 14 is incorporated herein by reference. The adhesive-applying apparatus of the present invention includes a shorter and wider horizontally extending frame having a shorter and wider inlet section, a shorter and wider outlet section, and a wider central section positioned between the inlet and outlet sections. The frame may be constructed from a plurality of connected supports, bracing members, and crossbars made from aluminum tubing or could alternatively be constructed from other suitable materials and wherein the inlet, central, and outlet sections are detachable from each other or wherein they are separate units positioned adjacent to each other. The frame may be supported by one or more sets of wheels connected to the frame in a conventional manner, thereby providing mobility and portability to the apparatus. In the stationary position, suitable bracing members may be attached to the frame to assist the wheels in supporting the apparatus.

The inlet section includes a power driven conveyor for driving a sheet of insulation from the inlet section to the central section and a magazine positioned above the conveyor for holding and dispensing sheets of insulation, one by one, onto the conveyor. The outlet section includes a sheet-receiving conveyer having a sheet stopping assembly for deactivating the power-driven conveyor until the sheet of insulation coated with adhesive is removed from the outlet section. The power-driven conveyor, magazine, and sheet-receiving conveyor are configured to hold, handle, and move the sheets of insulation oriented in a direction where the longer dimension extends transversely, as opposed to the direction of movement described in the U.S. Pat. No. 5,421,887 where the longer dimension extends longitudinally.

More specifically, the power-driven conveyor on the inlet section is adapted to drive a sheet of insulation from the inlet section to the central and outlet sections of the frame where the sheet is oriented to move along the axis of the shorter dimension. The conveyor is shorter and wider than the conveyor in U.S. Pat. No. 5,421,887 and includes a wider idle conveyor roller and a wider power-driven conveyor roller mounted at substantially opposite ends of the inlet section. A shorter and wider sized conveyor belt having inner and outer surfaces is trained about the conveyor rollers such that the belt's inner surface frictionally engages the conveyor rollers. A wider stabilizing roller may also be attached to the supports between the conveyor rollers for engaging and stabilizing the conveyor belt in a well-known manner.

The conveyor includes a pair of wider sheet-engaging pushers mounted on the outer surface of the conveyor belt and positioned wherein one pusher is mounted on the top reach of the conveyor belt and the other pusher is mounted on the bottom reach of the conveyor belt. Both pushers are attached to wider pusher brackets which in turn are secured to the outer surface of the wider conveyor belt by suitable fasteners to provide support for the pushers as they engage the side edge of the sheet of insulation. As the conveyor belt is driven, a pusher engages the side edge the sheet of insulation positioned on the conveyor belt and drives the sheet along the shorter axis toward the central section of the frame.

There is sufficient clearance between the conveyor belt on the inlet section and the hopper on the central section such that after the pusher fully drives the sheet to the central section, the conveyor belt rotates the pusher between the inlet and central sections from the top reach to the bottom reach. Simultaneously, the opposite pusher rotates from the bottom reach to the top reach at the other end of the inlet section to engage the side edge of the next sheet of insulation. It should be appreciated that after the pusher no longer engages the sheet under the hopper, the sheet stops moving toward the outlet section until the next sheet engaged by the opposite pusher abuts against and contacts the first sheet, side edge to side edge, and continues to drive the first sheet from under the hopper.

The wider magazine for holding a plurality of sheets of insulation and for dispensing the sheets of insulation, one by one, onto the conveyor belt is arranged over the conveyor belt. The magazine includes a plurality of posts attached to the respective crossbars of the inlet section. Attached to the lower end of each post is a suitable hinge which enables the post to alternate between vertical and horizontal positions to facilitate the loading of numerous sheets of insulation into the magazine. The posts cooperate to hold the sheets of insulation in alignment above the conveyor as gravity pulls the lowermost sheet onto the conveyor belt. All of the sheets of insulation in the magazine except for the lowermost sheet are maintained in the magazine by one or more magazine sheet retainers. The sheet retainers prevent all but the lowest sheet held in the magazine from being driven by the conveyor toward the center section.

The outlet section of the frame includes a sheet-receiving conveyor having a series of wider idler rollers disposed at substantially the same horizontal level as the rollers of the central section to facilitate the movement of the sheet of insulation as it is driven from the central section. A sheet-stopping assembly is provided on the outlet section to deactivate the conveyor when the sheet coated with adhesive passes from under the hopper and reactivate the conveyor when the sheet is removed from the outlet section.

It should therefore be appreciated that one of ordinary skill in the art could readily construct the adhesive-dispensing apparatus with a suitably dimensioned frame, power-driven conveyor, magazine, and sheet-receiving conveyor using the disclosure of the adhesive-dispensing apparatus of U.S. Pat. No. 5,421,887.

As diagrammatically illustrated in FIGS. 1 through 5, 7, and 8, the central section includes an elongated or substantially wider adhesive-dispensing hopper 50 for storing and applying adhesive onto the flat sections 40, 42, 44, and 46 of the top surface 22 of the sheet of insulation 20 adjacent to the drainage channels 34, 36, and 38 as the sheet is driven under the hopper 50. The hopper 50 includes an apertured bottom wall 52, spaced-apart downwardly converging inlet and outlet walls 54 and 56 connected to the bottom wall, and spaced-apart opposed side walls 58 and 60 connected to the bottom, inlet, and outlet walls and defining an adhesive storage area 62. The inlet wall of the hopper faces the inlet section of the frame and the outlet wall faces the outlet section of the frame. The elongated hopper is substantially as wide as the length or longer dimension of the sheet of insulation and the adhesive is applied through the spaced apart apertures or adhesive-discharge openings or outlets 64, 66, 68, and 70 in the bottom wall 52 which are respectively spaced apart to align with the flat areas 40, 42, 44, and 46 adjacent to the drainage channels 34, 36, and 38 along the entire length of a sheet being driven under the hopper while preventing adhesive from flowing into the drainage channels.

Figure 7:
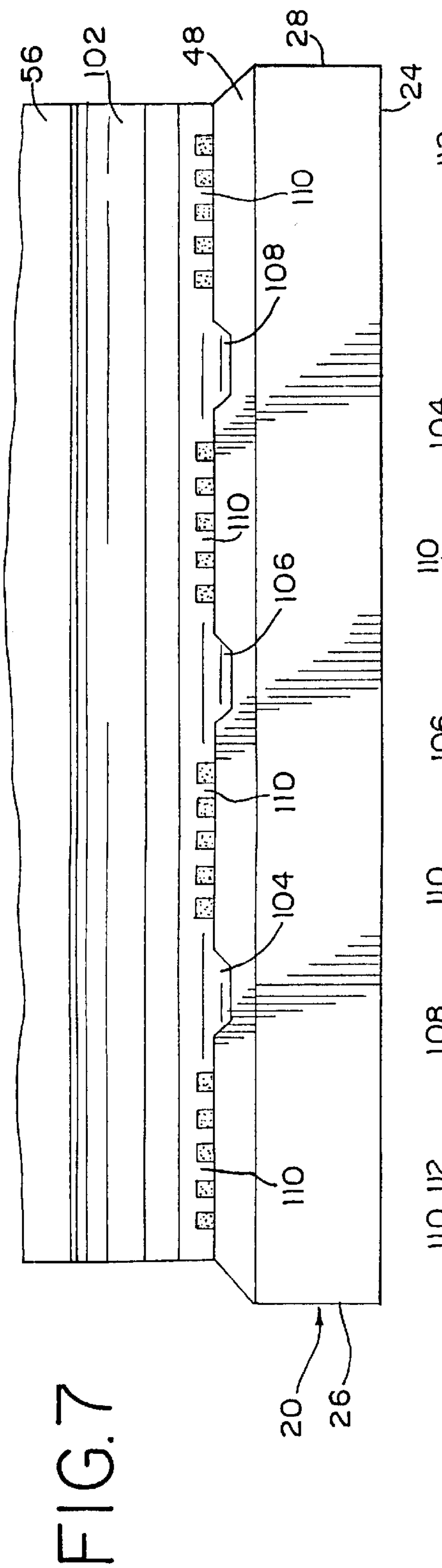
FIG. 7 is a fragmentary diagrammatic end view of the sheet of insulation, the outlet side of the hopper, and the screed attached to hopper.

As described in U.S. Pat. No. 5,421,887, the hopper may be mounted on a pair of spaced apart mounting brackets (not shown) having a plurality of suitable wider idle rollers 72 extending between the brackets at substantially the same height as the conveyor belt. These idle rollers support the insulation and facilitate the movement of the sheet of insulation as it is driven over the rollers 72 and under the hopper 50. A pair of vertically arranged side guide rollers may also be attached to each of the mounting brackets to engage the end walls 26 and 28 of the sheet of insulation and assist in guiding the sheet of insulation between the two brackets as it is driven under the hopper and between the mounting brackets while maintaining the sheet in alignment with the hopper. Although not shown, it should be appreciated that the mounting brackets include guide plates which coact with guide bars on the hopper to facilitate the hopper's vertical floating capability. A plurality of top guide rollers 74 are suitably connected to the inlet wall 54 of the hopper, as seen in FIG. 7, to engage the flat sections 40, 42, 44, and 46 of the top surface of the sheet of insulation to assist in controlling the vertical height or floating position of the hopper. The guide rollers may be suitably sized and positioned in a horizontally offset manner to accommodate the beveled edges of the sheet of insulation. The hopper may be biased downwardly toward the frame by suitable springs.

It should be appreciated that the hopper may also include a suitably hinged top cover for protecting and shading the adhesive stored in the hopper from sunlight, precipitation, and other contaminants or agents, thereby preventing the adhesive from drying due to heat or extended exposure or being diluted by precipitation. It should further be appreciated that the inside of the cover and the inside of the hopper could be lined with a suitable moisture-laden sheet for further protection of the adhesive stored in the hopper. The hopper may include one or more mixing shafts having augers, paddles, or other mixing tools for mixing the adhesive stored in the hopper. Before being filled with adhesive, the hopper and the screed may be coated or sprayed with a lubricant.

Figure 2:
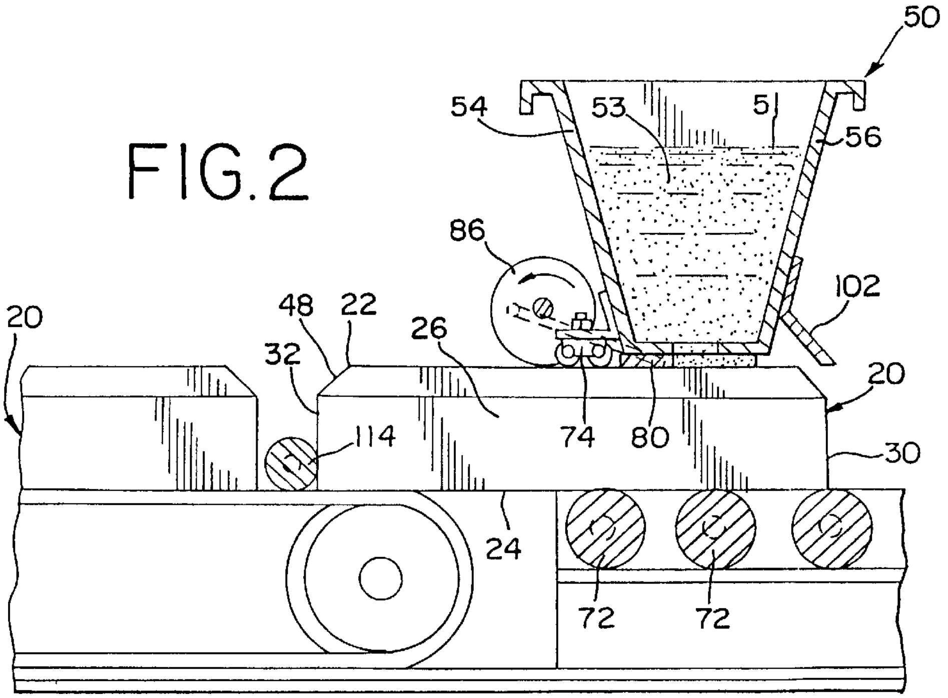
FIG. 2 is a fragmentary diagrammatic side view of the adhesive-applying apparatus illustrating the first sheet driven under the hopper, the hopper filled with adhesive, and the shutter in open position.
Figure 3:
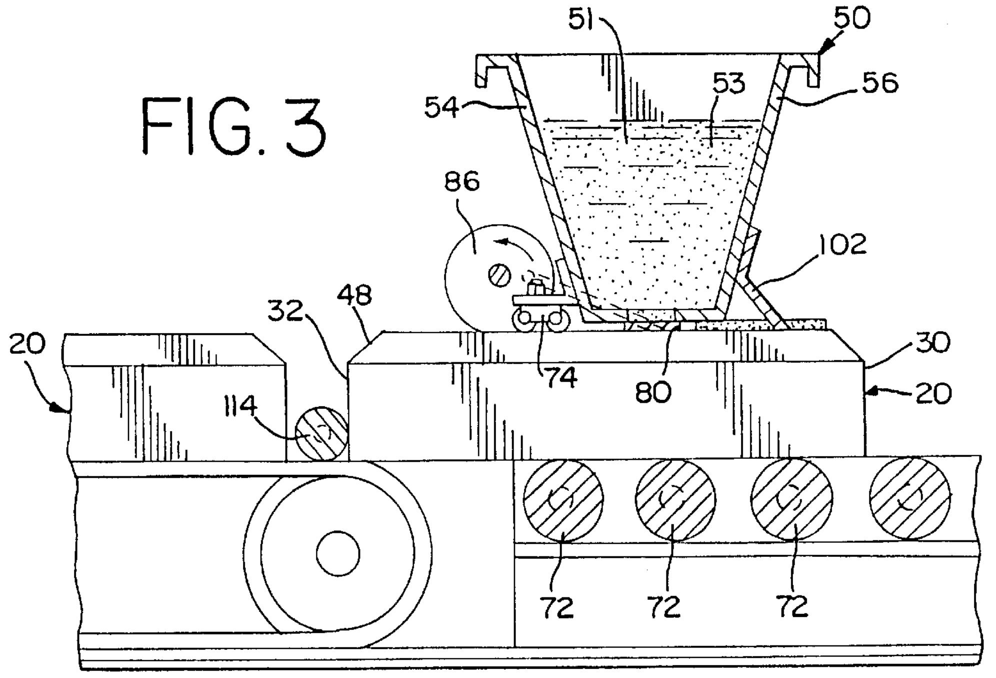
FIG. 3 is a fragmentary diagrammatic side view of the adhesive-applying apparatus illustrating the first sheet driven further under the hopper and the shutter in closed position.
Figure 4:
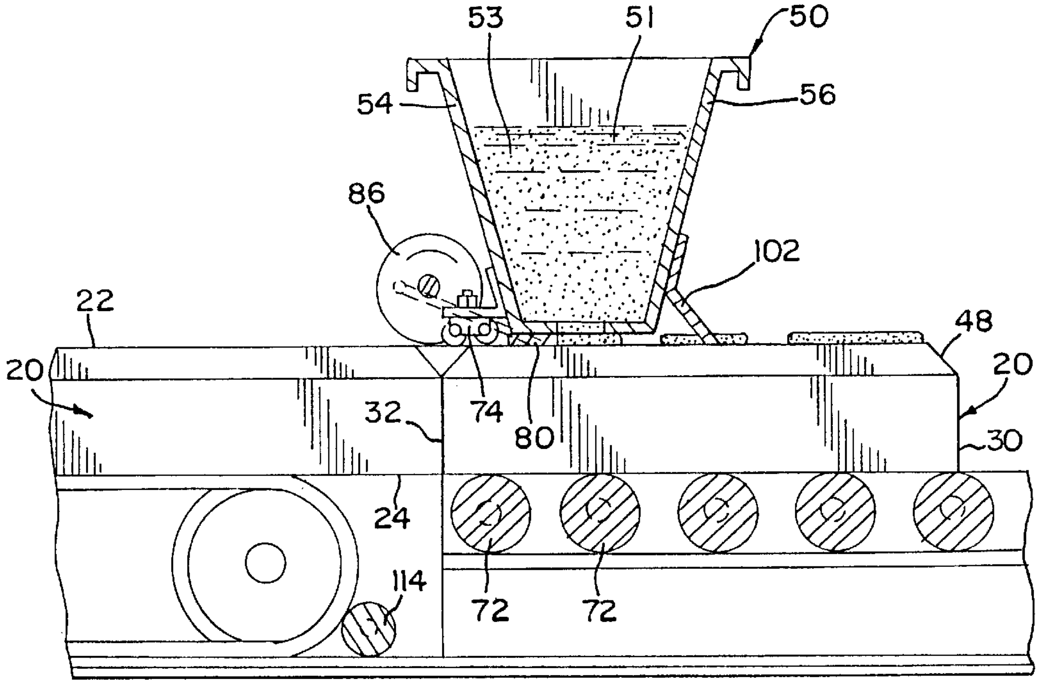
FIG. 4 is a fragmentary diagrammatic side view of the adhesive-applying apparatus illustrating the first sheet driven further under the hopper and the shutter in open position.
Figure 5:
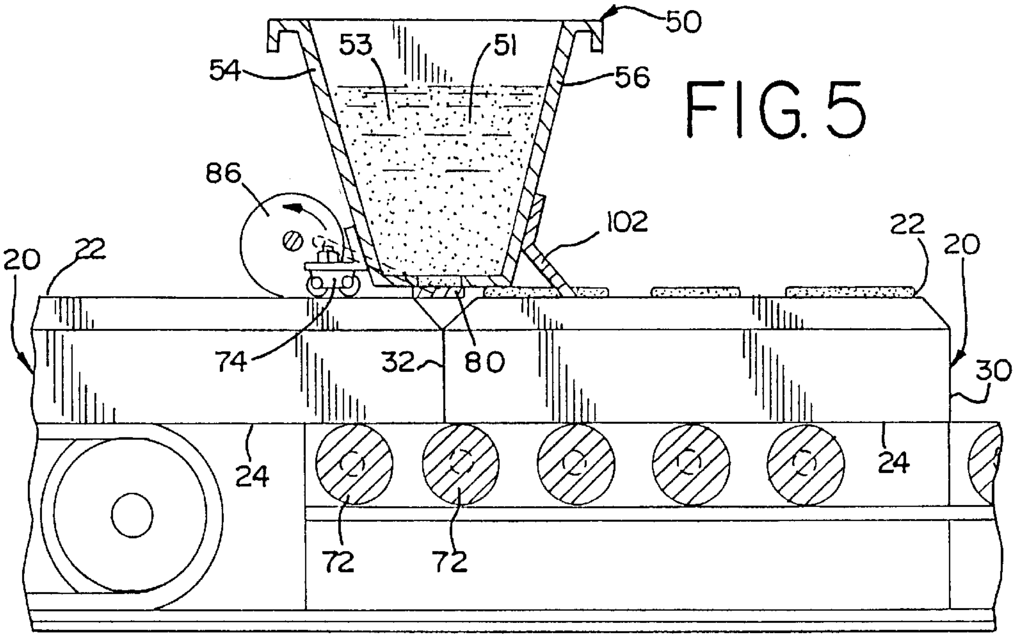
FIG. 5 is a fragmentary diagrammatic side view of the adhesive-applying apparatus illustrating the first sheet exiting from underneath the hopper, the shutter in closed position, and the second sheet partially driven under the hopper.
Figure 8:
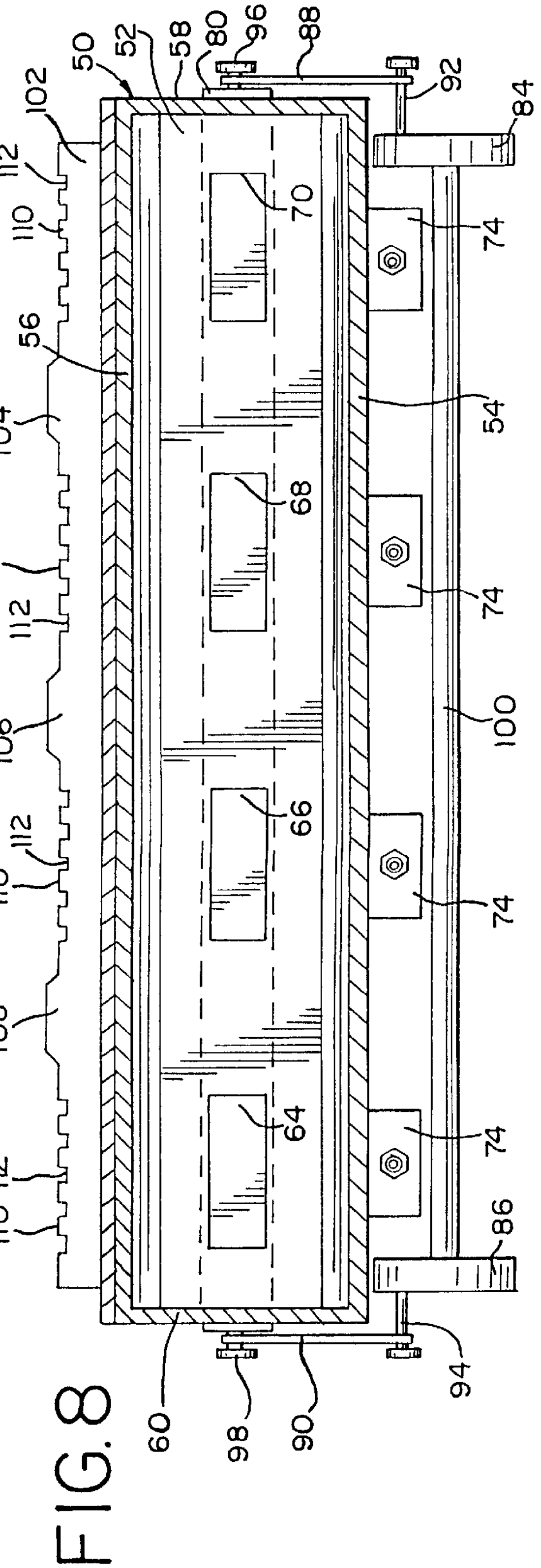
FIG. 8 is a diagrammatic cross-sectional view of the hopper taken substantially through line 8—8 of FIG. 1 illustrating the apertured bottom wall of the hopper, the shutter, the shutter driving wheels, and the screed.

The adhesive-applying apparatus further includes a shutter 80 attached to the hopper for intermittently interrupting the application or flow of adhesive to the top surface of the sheet of insulation 20 to define substantially adhesive-free pathways 82 across the flat sections on the top surface of the sheet of insulation to allow air-flow communication between the drainage channels when the sheet is secured to the building substrate. The elongated shutter 80 is slidably disposed against the lower surface of the bottom wall 52 of the hopper 50 and movable between a slot open position as illustrated in FIGS. 2 and 4 and a slot closed position as illustrated in FIGS. 1, 3, and 5. The shutter 20 is driven between open and closed positions by a pair of sheet-engaging shutter-driving wheels 84 and 86 disposed on the inlet side of the hopper 50 and connected to the shutter by a pair of linkage bars 88 and 90. The shutter-driving wheels respectively include laterally extending arms 92 and 94 pivotally attached to the linkage bars 88 and 90, and the shutter 20 respectively includes laterally extending brackets 96 and 98 pivotally connected to the opposite ends of the linkage bars 88 and 90, as illustrated in FIG. 8. Accordingly, as the sheet of insulation is driven under the hopper causing the wheels 84 and 86 to rotate, the wheels 84 and 86 drive the shutter 80 between open and closed positions. It should be appreciated that the wheels 84 and 86 may be connected by an axle 100 which may be suitably rotatably supported on the inlet wall of the hopper. It should be further appreciated that the shutter will be suitably held in sliding relation with the bottom wall of the hopper and alternative mechanisms for opening and closing the shutter could be employed in accordance with the present invention.

As illustrated in FIGS. 7 and 8, a removable screed or screed plate 102 is provided at the outlet side of the hopper 50 and along the lower end of outlet wall 56. A section of the screed plate 102 may slant downwardly and forwardly in the direction of sheet movement. The screed plate 102 includes a plurality of downwardly extending spaced apart scraper blades 104, 106, and 108 at its the lower end which are respectively aligned with the drainage channels 34, 36, and 38 on the sheets of insulation to engage the walls of the U-shaped drainage channels and scrape away any adhesive that may be deposited in the drainage channels. It could be appreciated that the scraper blades may be omitted if desired where close control of adhesive deposition on the flat areas would avoid the deposition of adhesive in the channels. A plurality of spaced apart teeth 110 are formed along the lower end of the screed plate adjacent to the scraper blades. The teeth define slots 112 which extend upwardly and are adapted to form beads of adhesive along the flat sections as the sheet coated with adhesive is driven under the screed. The slots 112 are sized larger than the spacer particles or beads in the adhesive compound to allow passage of the beads between the teeth.

The process of applying the adhesive compound to a series of sheets of insulation having transversely spaced apart drainage channels using the adhesive-applying apparatus of the present invention is generally illustrated in FIGS. 1 through 5. After the sheets are loaded into the magazine with the drainage channels facing upwardly and the lowermost or first sheet is dispensed onto the power-driven conveyor, the conveyor is turned on and the side edge 32 of the first sheet 20 is engaged by a pusher 114 to drive the sheet to the central section under the hopper 50, as illustrated in FIGS. 1 and 2. The conveyor is then shut off. The operator verifies that the shutter 80 is properly aligned in the open position and fills the hopper with the improved adhesive 51 containing the spacer elements 53. The adhesive from the hopper flows through the apertures 64, 66,68, and 70 in the bottom wall 52 onto the flat sections 40, 42, 44, and 46 of the top surface of the sheet of insulation as illustrated in FIG. 2.

The conveyor is then turned on and the first sheet further moves under the hopper 50 while the shutter 80 is driven by the wheels 84 and 86 to the closed position as illustrated in FIG. 3. The closing of the shutter 80 causes an area of the flat section to be substantially adhesive-free, thereby forming one of the transversely extending pathways 82. At the same time, the screed 102 attached to the outlet wall 56 of the hopper 50 engages the top surface of the sheet and the teeth 110 act to form beads of adhesive on the flat sections of the top surface of the sheet. The scraper blades 104, 106, and 110 respectively extend into and engage the drainage channels 34, 36, and 38 to prevent any excess adhesive from remaining in the drainage channels as the sheet passes from underneath the hopper. It should be appreciated that a nominal amount of adhesive may be screeded into the pathways 82 but will not block or close the pathways.

Figure 6:
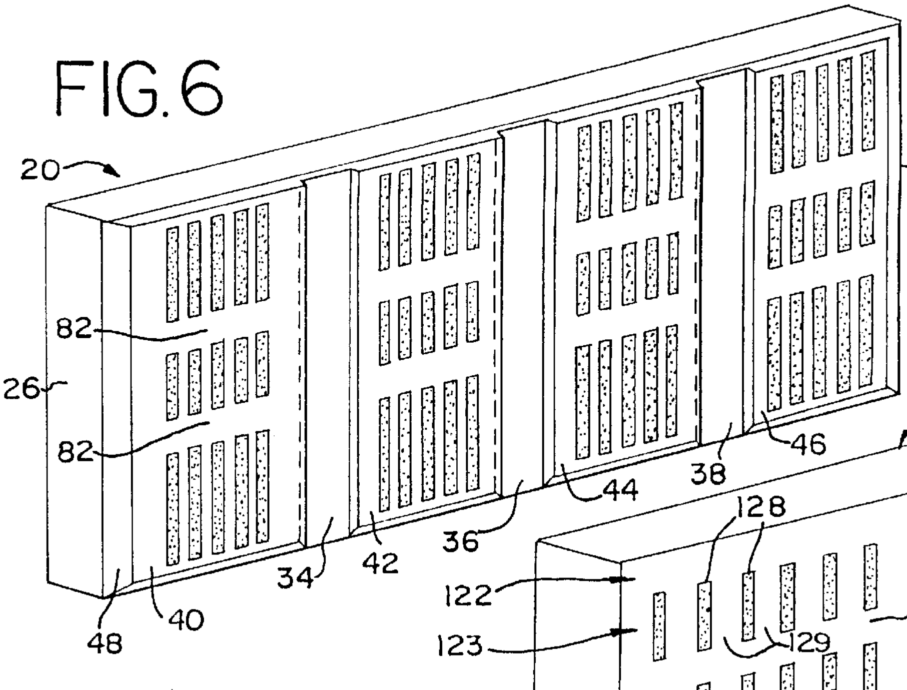
FIG. 6 is a perspective view of the sheet of insulation illustrating the transversely spaced apart drainage channels on the top surface of the sheet, the flat sections adjacent to the drainage channels being coated with beads of adhesive, and the transversely extending substantially adhesive-free pathways on the sheet connecting the drainage channels.

As the sheet further moves under the hopper, the shutter 80 is driven into the open position by the wheels 84 and 86 a second and third time, as illustrated in FIG. 4, to intermittently dispense adhesive onto the top surface of the sheet and to form the transversely extending substantially adhesive-free pathways 82 on the sheet of insulation, as illustrated in FIG. 6. As a substantial part of the first sheet passes underneath the hopper, the next or second sheet of insulation is dispensed by the magazine onto the conveyor and is engaged by another pusher. This second sheet is driven toward the hopper and contacts the first sheet, side edge to side edge, which is at least still partially under the hopper. The second sheet pushes the first sheet from under the hopper, leaving no gap between the sheets for the adhesive stored in the hopper to flow. Adhesive is then intermittently applied to the second sheet of adhesive in the same manner.

When the first sheet reaches the stopping assembly on the outlet section the power-driven conveyor is deactivated. This stops the movement of the second sheet of insulation and thus stops the movement of the first sheet. As the first sheet of insulation with the adhesive applied thereon is removed from the outlet side of the hopper, the stopping assembly reactivates the conveyor. The conveyor then continues to drive the second sheet of insulation under the hopper. By continually repeating the process, adding adhesive and sheets of insulation as necessary, adhesive may be applied to numerous sheets of insulation which are loaded in the magazine for application of adhesive.

Figure 9:
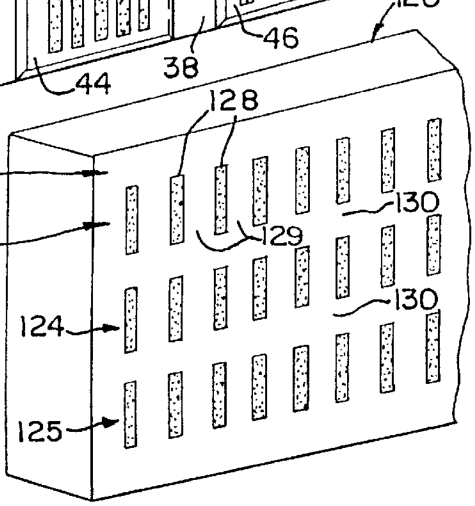
FIG. 9 is a fragmentary perspective view of a standard sheet of insulation illustrating the beads of adhesive applied to define channels.

A further embodiment of the invention involves utilizing the improved adhesive applicating apparatus for applying beads of improved adhesive compound to standard sheets of insulation like those identified in my above-mentioned U.S. Pat. No. 5,421,887. A standard sheet of insulation is shown in FIG. 9 and indicated by the numeral 120. It will be appreciated that this sheet of insulation will include opposing side walls 121 that are substantially flat and one of which adhesive compound may be applied before securing the sheet of insulation to a building substrate.

The adhesive applying apparatus of the invention will apply a pattern of adhesive beads generally indicated by the numeral 122 to one of the side walls of the sheet of insulation. The pattern includes beads much like that illustrated on the sheet of insulation shown in FIG. 6 wherein vertically spaced apart rows of beads 123, 124 and 125 each includes substantially a plurality of parallel spaced apart beads 128.

Inasmuch as the beads of adhesive include particles that function as spacers, when the sheet of insulation 120 is mounted on the building the sheet will be slightly spaced from the substrate surface of the building. The beads of adhesive define therebetween open areas or spaces 129 that become channels once the sheet of insulation is secured to a building substrate for allowing the passage of moisture and/or air flow. As above noted, because the adhesive includes spacing particles, when the sheet is squeezed onto the building substrate, the adhesive will not flow sufficiently to close the spaces 129 between the beads and thereby maintain open a plurality of vertically arranged channels.

Similarly, as mentioned with respect to the application of beads as shown in FIG. 6, by applying the beads in rows openings will be defined between adjacent rows in the areas 130 so that cross-ventilation may also be produced.

Accordingly, by incorporating the improved adhesive compound of the present invention with a standard sheet of insulation and as applied by the apparatus of the present invention, channels can be defined between the insulation and the building substrate for the passage of moisture and/or air flow.

It will be understood that modifications and variations may be effected without departing from the scope of the novel concepts of the present invention, and it is understood that this application is to be limited only by the scope of the appended claims.

The invention is hereby claimed as follows:

1. In an adhesive coated insulation sheet having one or more drainage channels for coacting with a building substrate to define airflow passageways when the sheet is affixed by adhesive to a building substrate, the improvement in the adhesive such that the channels will be open to airflow once the sheet is affixed to a building substrate, said adhesive comprising particles therein that function as spacers between the sheet and building substrate to substantially prevent the adhesive from flowing into the channels when the sheet is pressed on a building substrate thereby keeping the channels open to the flow of air and/or moisture.

2. An adhesive coated sheet of insulation, said sheet of insulation comprising top and bottom surfaces, one or more drainage channels on said top surface, and one or more adhesive-receiving sections on said top surface, said adhesive sheet comprising adhesive deposited on the adhesive-receiving sections of said top surface for securing the adhesive-receiving sections of the sheet to the building substrate, and particles in said adhesive for spacing said adhesive-receiving sections from the building substrate and for substantially preventing the adhesive means from flowing from the adhesive-receiving sections into the drainage channels when the sheet of insulation is pressed against the building substrate, whereby the drainage channels remain open to the flow of air and/or moisture when the sheets of insulation are adhered to the building substrate.

3. The adhesive compound of claim 2, wherein the particles are polyurethane.

4. The adhesive compound of claim 2, wherein the particles are polyurethane beads.

5. An adhesive coated sheet suitable for securing to a building substrate, said sheet of insulation comprising top and bottom substantially flat surfaces, said adhesive coated sheet comprising adhesive means deposited on said top surface of said sheet in substantially parallel spaced apart beads to form channels therebetween, and particles in said adhesive for spacing said sheet from the building substrate and for preventing the adhesive from flowing to close the channels when the sheet of insulation is pressed against the building substrate, whereby the channels remain open to the flow of air and/or moisture when said sheet of insulation is adhered to the building substrate.

6. The adhesive compound of claim 5, wherein the particles are polyurethane.

7. The adhesive compound of claim 21, wherein the particles are polyurethane beads.

8. In an adhesive coated insulation sheet having one or more drainage channels on said sheets for coacting with a building substrate to define airflow or moisture passageways when the sheet is affixed to a building substrate, the improvement in the adhesive such that channels will be formed once the sheet is affixed to a building substrate, said adhesive comprising particles therein that function as spacers between the sheet and building substrate to space the sheet from the substrate and substantially prevent the adhesive from flowing into the channels when the sheet is pressed on a building substrate thereby keeping the channels open to the flow of air and/or moisture.

* * * * *